United States Patent [19]

Feldle

[11] 4,236,767

[45] Dec. 2, 1980

[54] DEVICE FOR SEALING AND MOUNTING A ROLLING-ELEMENT BEARING

[75] Inventor: Kurt Feldle, Würzburg, Fed. Rep. of Germany

[73] Assignee: SKF Kugellagerfabriken GmbH, Schweinfurt, Fed. Rep. of Germany

[21] Appl. No.: 967,886

[22] Filed: Dec. 8, 1978

[30] Foreign Application Priority Data

Dec. 21, 1977 [DE] Fed. Rep. of Germany ... 7738870[U]

[51] Int. Cl.$^3$ .................................. F16C 33/78
[52] U.S. Cl. ..................... 308/187.1; 308/189 R; 308/DIG. 11
[58] Field of Search ............ 308/187.1, 186, 188, 308/189 R, DIG. 11; 267/161, 159

[56] References Cited

U.S. PATENT DOCUMENTS

| 1,985,693 | 12/1934 | Robinson | 308/186 |
| 3,259,383 | 7/1966 | Johnson et al. | 267/161 |
| 3,302,662 | 2/1967 | Webb | 267/161 |
| 3,510,138 | 5/1970 | Bowen et al. | 308/187.1 |
| 3,920,107 | 11/1975 | Limbacher | 308/236 |

Primary Examiner—Lenard A. Footland
Attorney, Agent, or Firm—Daniel M. Rosen

[57] ABSTRACT

A device for sealing and/or mounting a rolling-element bearing in a housing or on a shaft includes a sheet-metal disk secured to one of the bearing rings and an annular portion which interfaces with the other ring to form a seal. The disk has a second diverging annular portion which acts like a spring to urge the edges thereof into engagement with the housing or shaft for affixation thereto or to provide a resilient coupling between the bearing and housing or shaft.

12 Claims, 3 Drawing Figures

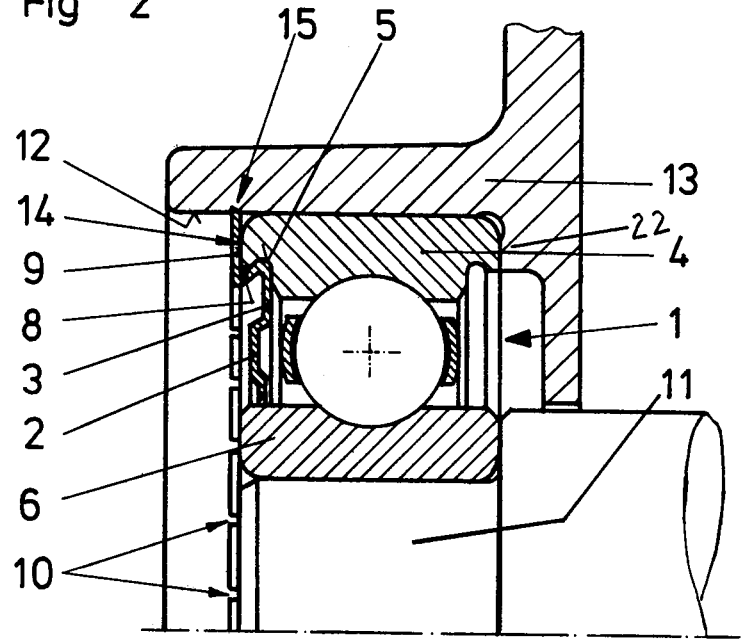
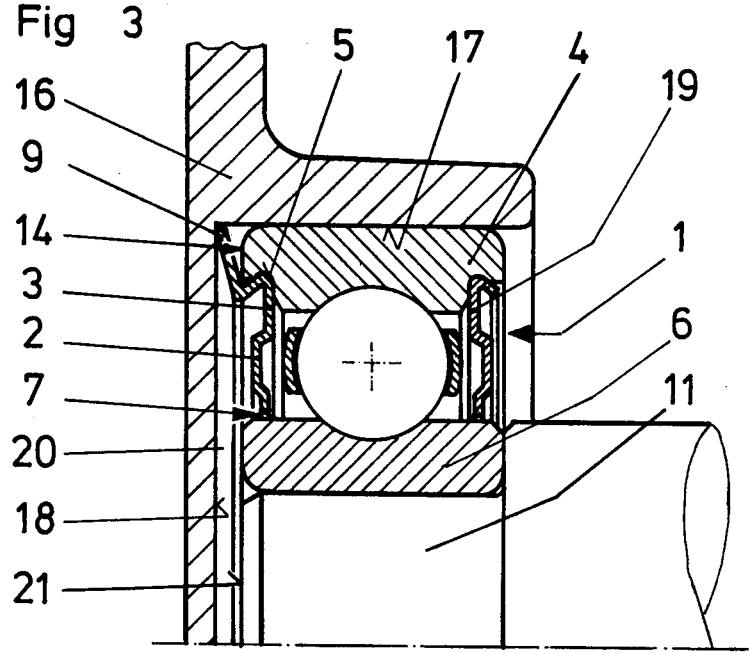

DEVICE FOR SEALING AND MOUNTING A ROLLING-ELEMENT BEARING

BACKGROUND OF THE INVENTION

In a number of bearing applications, a sealed rolling-element bearing must be precisely seated or resiliently mounted. This is the case with electrical machinery, for example, and particularly with the bearings of rotor shafts which are to run true and vibration-free.

It is known to use in rolling-element bearings a sealing disk constructed of sheet-metal which is snapped by means of an extremely resilient annular portion into an annular groove provided in the circular bore of an outer ring, the outer circumference of the sealing disk being deformed under pressure as the rolling-element bearing is installed in a bearing housing. An additional function of this prior-art seal is to reduce vibrations of the bearing and to prevent relative rotation between the bearing and the housing.

It is also known to provide the sealing disk described above with either an axially displaced outer ring portion or with a number of axially extending projections disposed concentrically with the axis of the bearing through which axial forces can be transmitted from the outer ring of the bearing to the housing of the bearing.

SUMMARY OF THE INVENTION

The disk-like device in accordance with the invention, which serves for both sealing and locating or resiliently mounting a bearing, can be set into one of the bearing rings and secured against rotation before the ring is assembled with the bearing rolling-element, thus providing for an easily handled unit that is ready for installation. After the bearing has been mounted on or in a machine part, the disk which can have the form of a hollow or cup-shaped spring extending radially outward along its axis may be deformed with the aid of an assembling tool so that its face abuts the bearing ring, at which time its rim is caused to dig into the machine part (housing or shaft) and thus locate and fix the bearing ring both in the axial and circumferential directions. If, on the other hand, a resilient mounting of the bearing is desired it can be accomplished by axially prestressing the disk and installing the bearing so that the rim of the disk in the shape of a cup spring comes to abut on a shoulder surface or the like of a connecting part with the spring under tension. In this way, one and the same design may be used for multiple purposes.

The disclosed design provides a device which will prevent a change in position or a deflection of the seat of the bearing even under dynamic loads or will make the bearing mount elastic and shock-absorbing. The design also provides for a non-rotatable attachment of the disk to one of the bearing rings.

It is therefore an object of the present invention to provide a device, for sealing a rolling-element bearing while mounting it in a housing or on a shaft, which includes a sheet-metal disk that can be attached to one of the bearing rings of a rolling-element bearing and which has a rim extending toward the other bearing ring and forming a seal with it.

Another object of the invention is to provide a device which is suitable, in and of itself, to precisely axially locate a rolling-element bearing or to resiliently mount the bearing.

Still another object of the invention is to provide such a device which can be manufactured economically.

Other and further objects of the invention will be apparent from the following drawings and description of a preferred embodiment in which like parts are indicated by like reference numerals in the various views.

DESCRIPTION OF THE DRAWINGS

FIG. 2 shows the bearing in accordance with FIG. 1 after its installation, the bearing being fixed in the axial direction; and FIG. 3 shows the bearing in accordance with FIG. 1 after its installation, the bearing being mounted so as to be resilient in the axial direction.

DESCRIPTION OF THE PREFERRED EMBODIMENT

Figure 1:
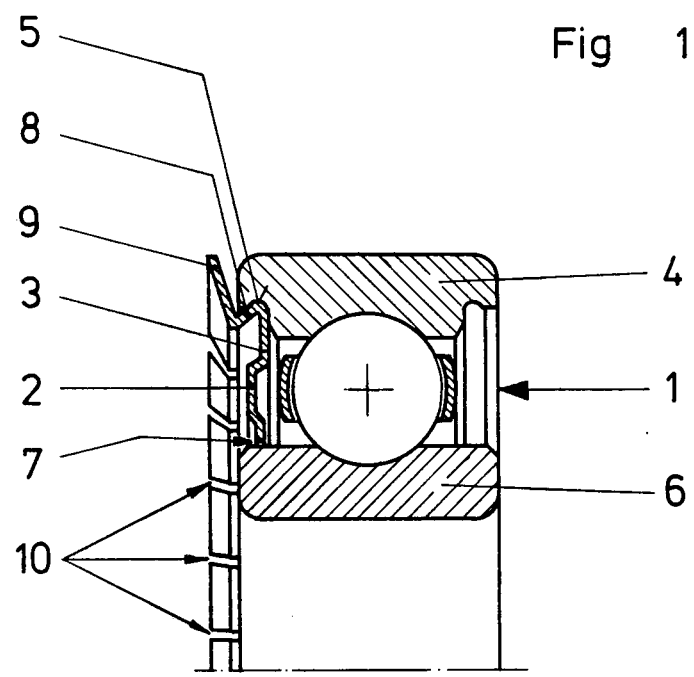
FIG. 1 is a cross-sectional view of a bearing before its installation in accordance with the invention.

Set into a bearing 1 in FIG. 1 is a sheet-metal disk 2, apertured at its center and there defining an inner rim, which may be fabricated, for example, from spring steel in a shaping operation. The sheet-metal disk 2 includes a flange-like annular portion 3 which extends radially inwardly toward the inner rim and has an annular shoulder portion which forms part of a connector section 8, for securing the disk in an annular groove 5 provided in the bore of a bearing outer ring 4. At its inner rim or circumference, the disk 2 forms a sealing interface 7 with the inner ring 6 of the bearing 1. The connector section 8 of the sheet-metal disk 2 terminates in a second star-shaped axially displaced outer portion 9 which extends radially outward and away from flange-like portion 3. The outer portion 9 can be conical, or, can have a concave or diverging cross-section like that of a hollow or cup-shaped spring, and is directed axially away from the bearing 1. Formed in the outer portion 9 at its outer circumference are slots 10 which are radially inwardly directed, extend approximately as far as the connector section 8, and are evenly distributed over the circumference. The sheet-metal disk 2, which is secured in the annular groove 5, through deformation and tensioning so as to prevent relative rotation between it and the bearing outer ring, seals the bearing 1 and forms a bearing assembly suitable for installation.

FIG. 2 illustrates an exemplified application of the bearing described above with reference to FIG. 1. The inner ring 6 of the bearing 1 is seated on the shaft journal 11 of a rotating shaft, and the outer ring 4 is seated in the bore 12 of a housing 13, and abuts against a shoulder 22 in the housing. The outer portion 9 of the sheet-metal disk 2, which on its periphery is provided with radial slots 10, has been deformed with the aid of suitable assembling tool by application of axial pressure so that it abuts against the face 14 of the outer bearing ring 4. As a result of the consequent expansion of the ouside diameter of the disk outer portion 9, its outer rim 15 is dug into the wall of the bore 12 and locked in it. Thus the sheet-metal disk 2 fixes the outer ring 4 axially in the housing 13 and secures it against rotation.

FIG. 3 shows another example of installation in which the bearing 1 is mounted for resiliency in the axial direction. The bearing 1, whose inner ring 6 is disposed at the end of a shaft journal 11 and whose outer ring 4 is non-rotatably secured to the sheet-metal disk 2 as previously described with reference to FIG. 1, is seated in a housing 16. The elastically acting conical cup-spring-shaped disk outer portion 9 of the sheetmetal disk 2, has an outside diameter slightly smaller than the diameter of the bore 17 in the housing 16 receiving the bearing 1 and resiliently bears on the surface 18 at which the bore 17 is terminated. At the open side of the bore 17, the bearing 1 is sealed by a cover disk 19 secured to the outer ring 4. The bearing 1 is axially located so that there is normally sufficient axial clearance 20 between the face 21 of the bearing 1 and the surface 18 at the end of the bore 17 to permit axial movement of the disk connector portion 8 and bearing 1 as the cup-spring-shaped outer portion 9 of the sheet-metal disk 2 resiliently deforms or flexes. Means for axially fixing the bearing in this case will be known to those skilled in the art. For this purpose, that is, where a resilient mounting is desired, the sheet-metal disk 2 may preferably be constructed as shown without radial slots 10 in the cup-spring-shaped outer portion of the disk 2.

In the embodiments in accordance with FIGS. 1, 2 and 3, the sheet-metal disk 2 serves to fix or secure a bearing 1 in position in the bore of a housing. The invention may also be used to secure or position a bearing on an axle or shaft. In this case, the sheet-metal disk would be non-rotatably secured in an annular groove worked into a surface of the inner bearing ring 6, and the portion 9 of the sheet-metal disk which has the cross-section of a cup spring would be directed radially inwardly toward the bore of the inner ring. The axial fixing or securing of the bearing on an axle or shaft could be done in a manner similar to that described in conjunction with FIGS. 2 and 3.

The invention is not limited to the exemplified embodiments illustrated but may be modified in different ways consistent with its underlying concept. For example, it is applicable to ball bearings as well as other types of bearings.

The sheet-metal disk 2, which by its substantially radially extending flange-like portion 3 forms, together with the shoulder of the inner ring 6, the sealing interface 7, may also be non-rotatably fastened to the face 14 of the outer ring 4 by welding or bonding, for example.

Finally, it is also possible to attach to the sheet-metal disk 2 a resilient disk made of a suitable material, such as rubber or plastic, which engages and brushes along a corresponding surface of the bearing ring to which the connector section is not non-rotatably attached while under tension, thus forming a wiping seal.

What is claimed is:

1. A device for sealing and mounting a rolling-element bearing having first and second bearing rings in a housing or on a shaft, comprising:
  a sheet-metal disk secured to one of said first and second bearing rings and having an annular portion extending toward the other of said first and second bearing rings and forming a seal therewith, said disk having a connector section for connecting it to said one ring and a second annular portion, said second annular portion having a diverging surface extending axially outward of said bearing at least before the rolling-element bearing is installed.

2. A device for sealing and mounting, as in claim 1, wherein the second annular portion has radial slots.

3. A device according to claim 1 wherein the surface of the second annular portion of the disk diverges axially away from the rolling element bearing.

4. A device as in claim 2, wherein the second annular portion is star-shaped.

5. A device as in any of claims 1 to 4, wherein one of said bearing rings has an annular groove in which the sheetmetal disk is secured.

6. A device as in claim 5, wherein the sheet-metal disk is bonded to a face of one of the bearing rings.

7. The device of claim 1, wherein said second annular portion is an elastically acting conical cup-shaped spring.

8. The device of claim 7, wherein said one ring is an outer bearing ring, said connector section being affixed to said outer bearing ring, and said cup-shaped spring extends radially outwardly of said connector section to be spaced axially outwardly of said outer bearing ring.

9. The device of claim 8, wherein said cup-shaped spring has a diameter less than that of said outer ring.

10. The device of claim 8, wherein said spring has a diameter greater than that of said outer bearing ring.

11. The device of claim 8, wherein said outer bearing ring has an annular groove in its bore, said connector section being held in said groove.

12. A rolling element bearing having inner and outer radially spaced apart bearing rings and rolling elements held therein, and a combined seal and mounting ring affixed thereto, said outer bearing ring having a groove in the bore thereof, said ring having a sealing portion extending from said groove radially inwardly towards the inner bearing ring, a central section held in said groove, and a mounting section extending radially and axially outwardly of said outer bearing ring from said groove in a diverging manner to form an elastically acting cup-shaped spring.

* * * * *